United States Patent
Hoshino

(10) Patent No.: US 11,093,716 B2
(45) Date of Patent: Aug. 17, 2021

(54) CONVERSATION SUPPORT APPARATUS, CONVERSATION SUPPORT METHOD, AND COMPUTER READABLE RECORDING MEDIUM

(71) Applicant: NEC Corporation, Tokyo (JP)

(72) Inventor: Ayako Hoshino, Tokyo (JP)

(73) Assignee: NEC CORPORATION, Tokyo (JP)

( * ) Notice: Subject to any disclaimer, the term of this patent is extended or adjusted under 35 U.S.C. 154(b) by 74 days.

(21) Appl. No.: 16/493,357

(22) PCT Filed: Mar. 31, 2017

(86) PCT No.: PCT/JP2017/013707
§ 371 (c)(1),
(2) Date: Sep. 12, 2019

(87) PCT Pub. No.: WO2018/179373
PCT Pub. Date: Oct. 4, 2018

(65) Prior Publication Data
US 2020/0034430 A1    Jan. 30, 2020

(51) Int. Cl.
*G06F 40/30* (2020.01)
*G06F 40/20* (2020.01)
(Continued)

(52) U.S. Cl.
CPC .............. *G06F 40/30* (2020.01); *G06F 40/20* (2020.01); *G10L 15/22* (2013.01); *H04M 3/5166* (2013.01); *G10L 2015/223* (2013.01)

(58) Field of Classification Search
CPC ......... G06F 40/30; G06F 40/20; G10L 15/22; G10L 2015/223; G10L 15/26; H04M 3/51;
(Continued)

(56) References Cited

U.S. PATENT DOCUMENTS 5,918,222 A * 6/1999 Fukui ..................... G06Q 10/10
6,161,083 A * 12/2000 Franz .................... G06F 40/211
704/4

(Continued)

FOREIGN PATENT DOCUMENTS

JP    H09-198399 A    7/1997
JP    2008-123447 A    5/2008
(Continued)

OTHER PUBLICATIONS

Kim, A., Song, H., & Park, S. "A two-step neural dialog state tracker for task-oriented dialog processing". 2018, Computational Intelligence and Neuroscience, 2018, NA. Retrieved from https://dialog.proquest.com/professional/docview/2225569324?accountid=131444 (Year: 2018).*

(Continued)

*Primary Examiner* — Eric Yen
(74) *Attorney, Agent, or Firm* — Sughrue Mion, PLLC

(57) ABSTRACT

A conversation support apparatus 10 includes: an utterance reception unit 11 that receives an utterance in an on-going conversation; an utterance position estimation unit 12 that, for each node in a conversation tree in which at least one of a label and a topic is provided to each node, collates the at least one of the label and the topic provided to the node and the received utterance, and estimates a node that is most related to the received utterance; and a display unit 13 that adds a visual characteristic representation to the estimated node and displays the conversation tree on a screen.

12 Claims, 7 Drawing Sheets

(51) Int. Cl.
*G10L 15/22* (2006.01)
*H04M 3/51* (2006.01)

(58) Field of Classification Search
CPC . H04M 3/5141; H04M 3/5166; H04M 3/5175
See application file for complete search history.

(56) References Cited

U.S. PATENT DOCUMENTS

| | | | | |
|---|---|---|---|---|
| 6,295,551 | B1* | 9/2001 | Roberts | G06F 9/44526 709/203 |
| 7,069,513 | B2* | 6/2006 | Damiba | G10L 15/063 704/E15.008 |
| 7,162,421 | B1* | 1/2007 | Zeppenfeld | G10L 15/22 704/233 |
| 9,172,805 | B1* | 10/2015 | Jayapalan | G10L 13/00 |
| 2002/0049805 | A1* | 4/2002 | Yamada | G06F 3/167 709/202 |
| 2006/0212515 | A1* | 9/2006 | Shienbrood | 709/203 |
| 2006/0224392 | A1* | 10/2006 | Kershaw | G10L 15/28 704/270.1 |
| 2007/0150274 | A1* | 6/2007 | Fujimoto | G10L 15/20 704/233 |
| 2007/0198272 | A1* | 8/2007 | Horioka | H04M 3/493 704/275 |
| 2008/0167914 | A1* | 7/2008 | Ikeda | G06Q 30/0201 705/7.13 |
| 2008/0201133 | A1* | 8/2008 | Cave | G10L 15/1815 704/10 |
| 2008/0201135 | A1* | 8/2008 | Yano | G10L 15/1822 704/201 |
| 2008/0256063 | A1* | 10/2008 | Nasukawa | G06Q 30/0256 |
| 2008/0319748 | A1* | 12/2008 | Nakano | G10L 15/22 704/251 |
| 2009/0222507 | A1* | 9/2009 | Koseki | G06Q 10/00 709/202 |
| 2016/0163311 | A1* | 6/2016 | Crook | G10L 15/065 704/275 |
| 2016/0227038 | A1* | 8/2016 | Odinak | H04M 3/523 |
| 2017/0228366 | A1* | 8/2017 | Bui | G06F 40/247 |
| 2017/0270929 | A1* | 9/2017 | Aleksic | G06F 40/295 |
| 2017/0337036 | A1* | 11/2017 | Fujii | G06F 40/35 |
| 2018/0075847 | A1* | 3/2018 | Lee | G06F 16/3329 |
| 2018/0121415 | A1* | 5/2018 | Perez | G10L 15/08 |
| 2018/0130463 | A1* | 5/2018 | Jeon | G10L 15/063 |

FOREIGN PATENT DOCUMENTS

| | | |
|---|---|---|
| JP | 5158635 B2 | 3/2013 |
| WO | 2006/090881 A1 | 8/2006 |

OTHER PUBLICATIONS

International Search Report for PCT Application No. PCT/JP2017/013707, dated Jun. 20, 2017.

* cited by examiner

CONVERSATION SUPPORT APPARATUS, CONVERSATION SUPPORT METHOD, AND COMPUTER READABLE RECORDING MEDIUM

This application is a National Stage Entry of PCT/JP2017/013707 filed on Mar. 31, 2017, the contents of all of which are incorporated herein by reference, in their entirety.

TECHNICAL FIELD

The present invention relates to a conversation support apparatus and a conversation support method for supporting an operator at a contact center or the like in having a conversation with a user, and further relates to a computer readable recording medium including a program recorded therein that is for realizing the conversation support apparatus and conversation support method.

BACKGROUND ART

In recent years, companies have been introducing contact centers providing chat-based correspondence. With a contact center providing chat-based correspondence, users can immediately make inquiries whenever they have questions, and moreover, users can immediately receive the answers they want. Contact centers providing chat-based correspondence solve both the problem with conventional telephone-based contact centers, i.e., the problem that it is difficult to get calls through to conventional telephone-based contact centers, and the problem with mail-based contact centers, i.e., the problem that it takes time until responses are received from mail-based contact centers.

Incidentally, timeliness is crucial for contact centers providing chat-based correspondence, and due to this, user satisfaction will decrease if it takes a long time until responses are received from a contact center. Due to this, Patent Document 1 proposes a system for supporting operators at a contact center providing chat-based correspondence.

Specifically, the system disclosed in Patent Document 1 stores histories of conversations between users and operators, and combines the stored conversation histories to generate conversation trees. Furthermore, with the system disclosed in Patent Document 1, operators can search for past conversations based on conversation trees, and thus, even if questions that are difficult to answer immediately are received, the operators can provide answers based on past conversations.

LIST OF RELATED ART DOCUMENTS

Patent Document

Patent Document 1: Japanese Patent No. 5158635

SUMMARY OF INVENTION

Problems to be Solved by the Invention

Incidentally, at a contact center handling a lot of chat-based correspondence, there are cases in which one operator provides assistance to a plurality of users simultaneously. Due to this, there is a possibility of situations occurring where an operator mistakes a user with another user or fails to correctly grasp the current state. Furthermore, there is a possibility of similar situations occurring even if an operator is providing assistance to a user one-on-one because there are cases in which a large number of questions ceaselessly arrive at a contact center.

However, the system disclosed in Patent Document 1 merely creates conversation trees for past conversations, and it is difficult to avoid the occurrence of situations such as those described above with the system disclosed in Patent Document 1.

An example object of the present invention is to provide a conversation support apparatus, a conversation support method, and a computer readable recording medium that overcome the above-described problem and that are capable of suppressing the occurrence of errors such as mistakes by operators at contact centers or the like.

Means for Solving the Problems

In order to achieve the above-described object, a conversation support apparatus according to an example aspect of the present invention includes:

an utterance reception unit configured to receive an utterance in an on-going conversation;

an utterance position estimation unit configured to, for each of a plurality of nodes in a conversation tree in which at least one of a label and a topic is provided to each of the plurality of nodes, collate the at least one of the label and the topic provided to the node and the received utterance, and estimate a node that is most related to the received utterance; and a display unit configured to add a visual characteristic representation to the estimated node and display the conversation tree on a screen.

In order to achieve the above-described object, a conversation support method according to an example aspect of the present invention includes:

(a) a step of receiving an utterance in an on-going conversation;

(b) a step of, for each of a plurality of nodes in a conversation tree in which at least one of a label and a topic is provided to each of the plurality of nodes, collating the at least one of the label and the topic provided to the node and the received utterance, and estimating a node that is most related to the received utterance; and (c) a step of adding a visual characteristic representation to the estimated node and displaying the conversation tree on a screen.

Furthermore, in order to achieve the above-described object, a computer readable recording medium according to an example aspect of the present invention includes a program recorded thereon, the program including instructions that cause a computer to carry out:

(a) a step of receiving an utterance in an on-going conversation;

(b) a step of, for each of a plurality of nodes in a conversation tree in which at least one of a label and a topic is provided to each of the plurality of nodes, collating the at least one of the label and the topic provided to the node and the received utterance, and estimating a node that is most related to the received utterance; and (c) a step of adding a visual characteristic representation to the estimated node and displaying the conversation tree on a screen.

Advantageous Effects of the Invention

As described above, according to the present invention, the occurrence of errors such as mistakes by operators at contact centers or the like can be suppressed.

EXAMPLE EMBODIMENT

Example Embodiment

In the following, a conversation support apparatus, a conversation support method, and a program in an example embodiment of the present invention will be described while referring to FIGS. 1 to 6.

Apparatus Configuration

Figure 1:
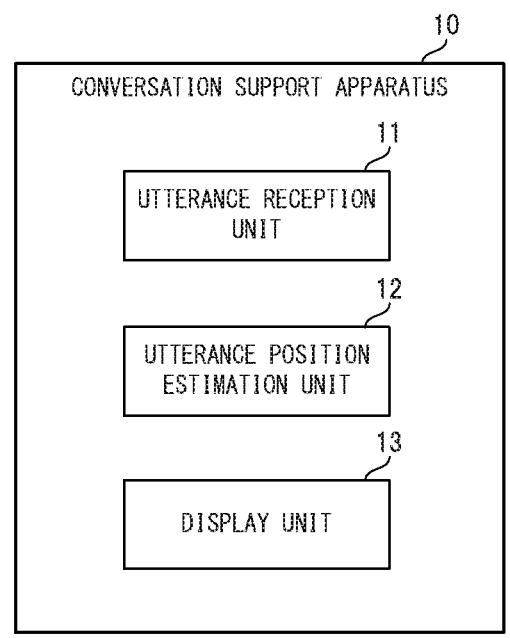
FIG. 1 is a block diagram schematically illustrating the configuration of a conversation support apparatus in an example embodiment of the present invention.

First, the configuration of the conversation support apparatus in the present example embodiment will be described with reference to FIG. 1. FIG. 1 is a block diagram schematically illustrating the configuration of the conversation support apparatus in the example embodiment of the present invention.

A conversation support apparatus 10 in the present example embodiment, which is illustrated in FIG. 1, is an apparatus for supporting conversations between users and operators at contact centers or the like. As illustrated in FIG. 1, the conversation support apparatus 10 includes an utterance reception unit 11, an utterance position estimation unit 12, and a display unit 13.

The utterance reception unit 11 receives an utterance in an on-going conversation. For each of a plurality of nodes in a conversation tree in which at least one of a label and a topic is provided to each of the plurality of nodes, the utterance position estimation unit 12 collates the at least one of the label and the topic provided to the node with the received utterance, and estimates a node that is most related to the received utterance. The display unit 13 adds a visual characteristic representation to the estimated node and displays the conversation tree on a screen. Note that examples of the screen include a screen of a display device attached to the conversation support apparatus 10 and a screen of a terminal device connected to the conversation support apparatus 10.

As described above, in the present example embodiment, a conversation tree node that an utterance relates to is displayed on a screen with a visual characteristic representation. Accordingly, according to the present example embodiment, an operator can understand, at a glance on a screen, the state in which a conversation with a user is currently situated, and thus, the occurrence of errors such as mistakes by operators at contact centers or the like can be suppressed.

Figure 2:
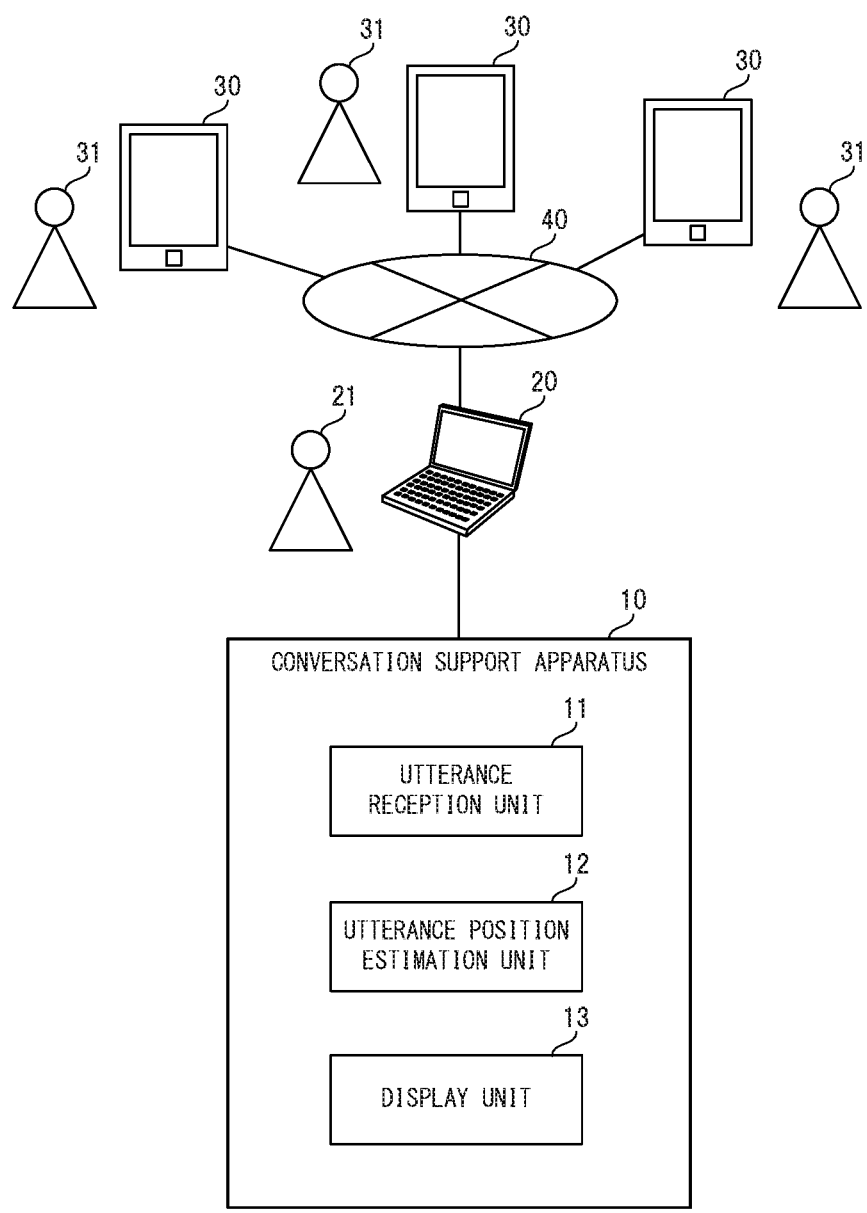
FIG. 2 is a block diagram specifically illustrating the configuration of the conversation support apparatus in the example embodiment of the present invention.
Figure 3:
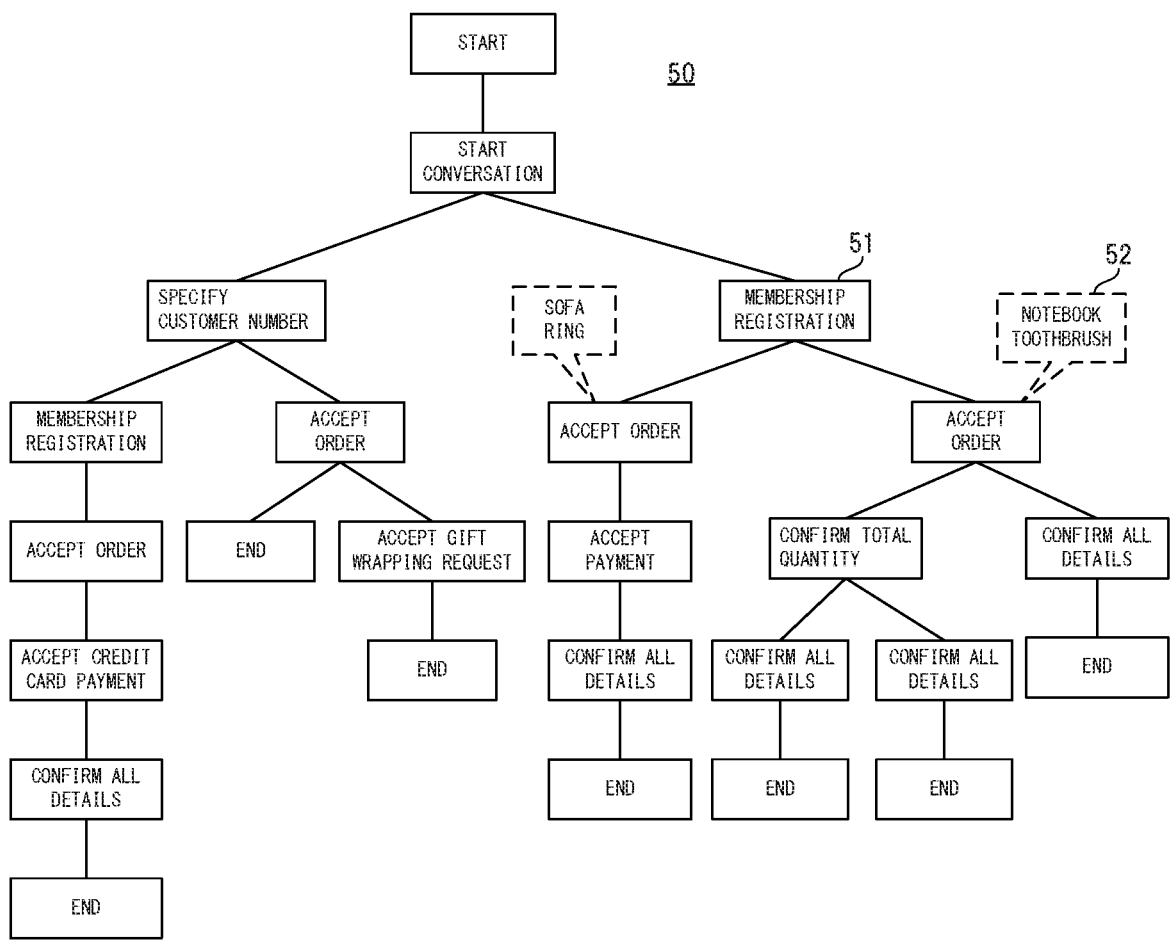
FIG. 3 is a diagram illustrating one example of a conversation tree used in the example embodiment of the present invention.
Figure 4:
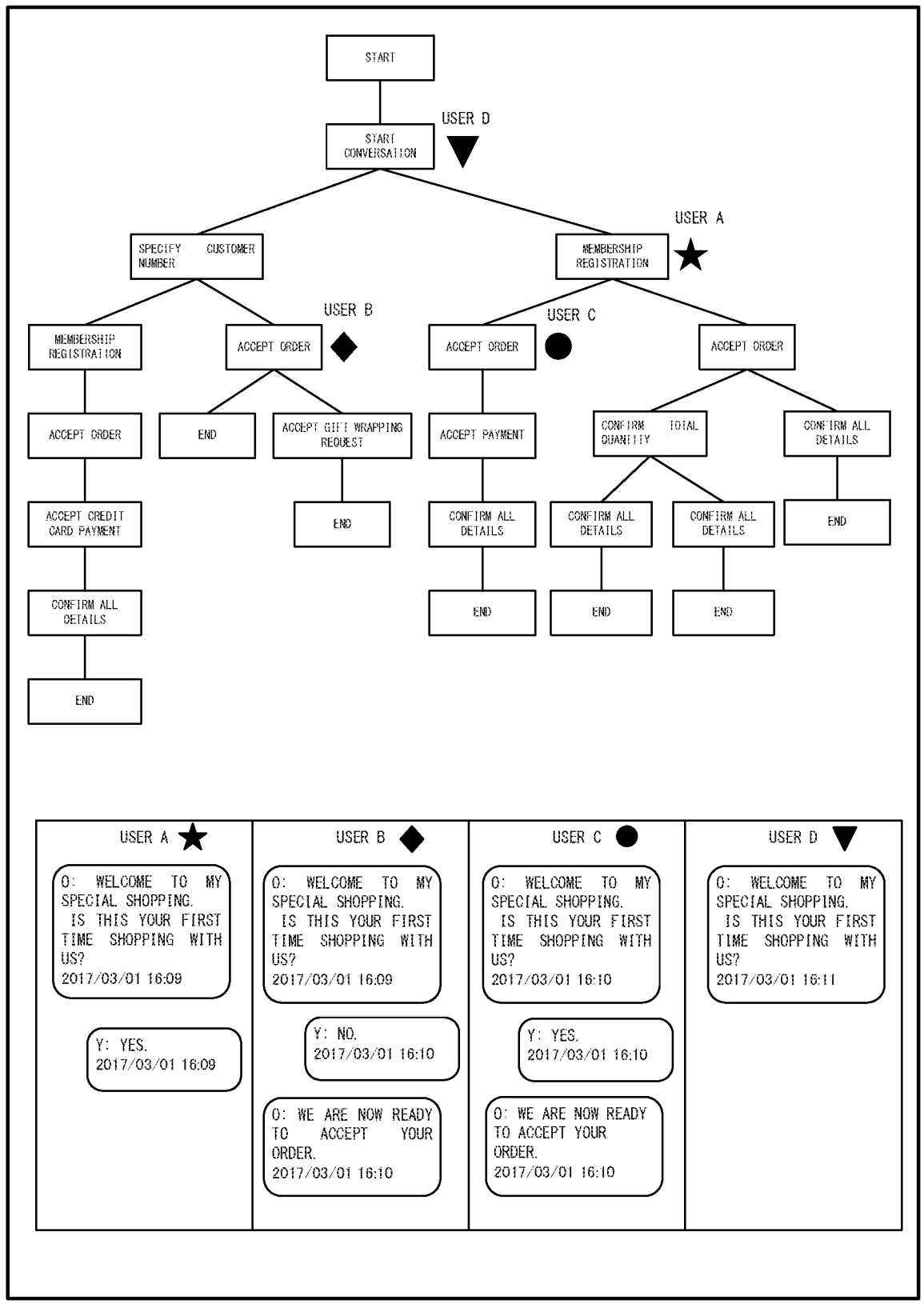
FIG. 4 is a diagram illustrating one example of a conversation tree displayed by the conversation support apparatus in the example embodiment of the present invention.

Next, the configuration of the conversation support apparatus in the present example embodiment will be described specifically with reference to FIGS. 2 to 4. FIG. 2 is a block diagram specifically illustrating the configuration of the conversation support apparatus in the example embodiment of the present invention. FIG. 3 is a diagram illustrating one example of a conversation tree used in the example embodiment of the present invention. FIG. 4 is a diagram illustrating one example of a conversation tree displayed by the conversation support apparatus in the example embodiment of the present invention.

As illustrated in FIG. 2, the conversation support apparatus 10 is connected to a terminal device 20 of an operator 21 in the present example embodiment. Furthermore, the terminal device 20 of the operator 21 is connected to terminal devices 30 of users 31 over the Internet 40.

In the present example embodiment, a conversation is a chat, and a conversation between the operator 21 and a user 31 is carried out via the respective terminal devices used by the operator 21 and the user 31. Furthermore, the operator 21 can simultaneously have chat-based conversations with a plurality of users 31.

If the operator 21 is simultaneously having chat-based conversations with a plurality of users 31, the utterance reception unit 11 receives an utterance for each of the plurality of on-going conversations. In such a case, the utterance position estimation unit 12, for each of the conversations, estimates a node that is most related to the received utterance, and the display unit 13 adds a visual characteristic representation to the estimated node for each of the conversations and displays the conversation tree on the screen.

Furthermore, as illustrated in FIG. 3, a conversation tree 50 used in the present example embodiment is data obtained by representing the flow of conversations in a tree structure, and each node indicates a stage in a conversation. The conversation tree 50 illustrated in the example in FIG. 3 is obtained by representing the flow of conversations at a contact center by using a tree structure.

A label 51 indicating a state of a conversation is provided to each node. The labels 51 indicate states of conversations. For example, the labels 51 may be manually provided when the conversation tree is created, or may be provided by a computer. Pattern matching using speech acts, sentence classification using supervised machine learning, and the like are examples of methods for providing the labels 51 using a computer.

Furthermore, a topic 52 is provided to each node, in addition to the label 51. The topics 52 each include feature words having a high possibility of appearing in a conversation in the state of the corresponding node. Note that in the example in FIG. 3, topics for only some nodes are illustrated as examples, but in actuality, the topic 52 is provided to each node. Furthermore, in the present example embodiment, only the label 51 may be provided to each node, or only the topic 52 may be provided to each node.

Furthermore, in the present example embodiment, the conversation tree 50 may be manually created based on conversation histories or may be generated from a large number of conversation histories through processing using a computer, such as clustering.

In the present example embodiment, based on a received utterance, the utterance position estimation unit 12 first specifies a state indicated by the utterance and a feature word included in the utterance. Subsequently, the utterance position estimation unit 12 collates the utterance state and the feature word that have been specified with the label 51 and the topic 52 of each node, and estimates a node that is most related to the received utterance.

Furthermore, the utterance position estimation unit 12 can also estimate a node that is related to a received utterance by converting the utterance into a numeric vector. Specifically, the utterance position estimation unit 12 first converts an utterance into a numeric vector according to the frequency of appearance of words included in the utterance, or the like. Next, the utterance position estimation unit 12 calculates a numeric vector for each candidate node, with the node (current position node) previously estimated as the current position and a child node of the current position node being set as candidate nodes. Then, the utterance position estimation unit 12 calculates, for each candidate node, a score indicating the similarity between the numeric vector of the candidate node and the numeric vector of the utterance. The Euclidean distance, the cosine similarity, or the like can be considered as examples of scores indicating similarity. If there is no node with a sufficiently high similarity among the estimated current position node and the child node of the current position node, the utterance position estimation unit 12 expands the subject of search to the entire conversation tree and searches for a node having a sufficiently high similarity.

In the present example embodiment, the display unit 13 can add a visual characteristic representation to an estimated node by making the color of the estimated node different from the color of other nodes, for example. Furthermore, the visual characteristic representation is not limited to that using color, and may be a characteristic figure or pattern.

In the example in FIG. 4, figures assigned to individual users are used as visual characteristic representations. Furthermore, as illustrated in the example in FIG. 4, the display unit 13 can also simultaneously display chats between the operator 21 and the users 31, along with the nodes to which the characteristic representations are added.

Device Operations

Figure 5:
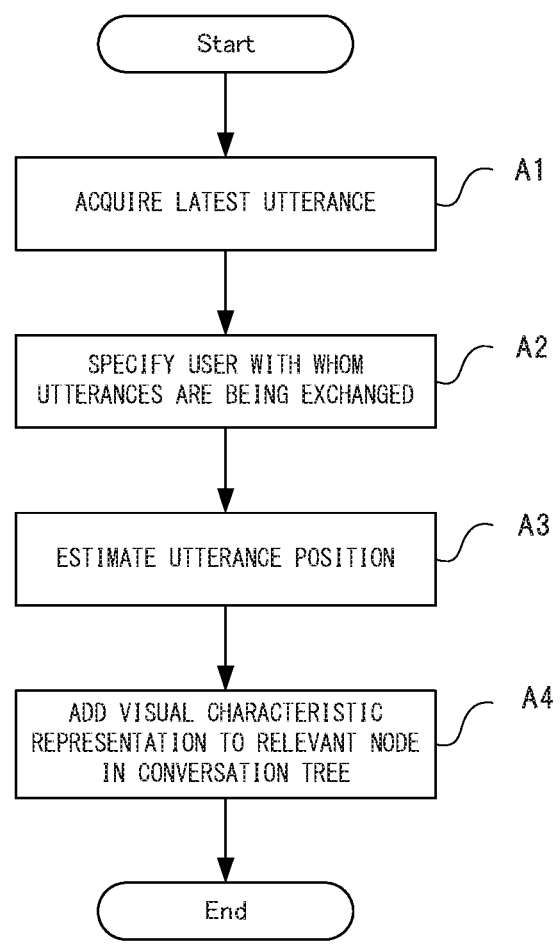
FIG. 5 is a flowchart illustrating operations of the conversation support apparatus in the example embodiment of the present invention.

Next, the operations of the conversation support apparatus 10 in the example embodiment of the present invention will be described with reference to FIG. 5. FIG. 5 is a flowchart illustrating operations of the conversation support apparatus in the example embodiment of the present invention. FIG. 1 will be referred to as needed in the following description. Furthermore, in the present example embodiment, the conversation support method is implemented by causing the conversation support apparatus 10 to operate. Accordingly, the following description of the operations of the conversation support apparatus 10 is substituted for the description of the conversation support method in the present example embodiment.

As illustrated in FIG. 5, first, the utterance reception unit 11 receives the latest utterance in an on-going conversation between the operator 21 and a user 31 (step A1). Furthermore, the utterance reception unit 11 specifies the user 31 with whom utterances are being exchanged (step A2).

Next, the utterance position estimation unit 12, for each of the plurality of nodes in the conversation tree 50 (see FIG. 3), in which at least one of the label and the topic is provided to each of the plurality of nodes, collates the label provided to the node and the utterance received in step A1, and estimates a node that is most related to the received utterance (step A3).

Next, the display unit 13 adds a visual characteristic representation to the estimated node and displays the conversation tree on the screen (step A4). Specifically, in step A4, the display unit 13 provides a figure representing the user 31 specified in step A2 to the estimated node in the conversation tree displayed on the screen of the terminal device 20 of the operator 21, as illustrated in FIG. 4.

Following the execution of step A4, step A1 is executed once again if a new utterance is generated between the operator 21 and any of the users 31.

Figure 6:
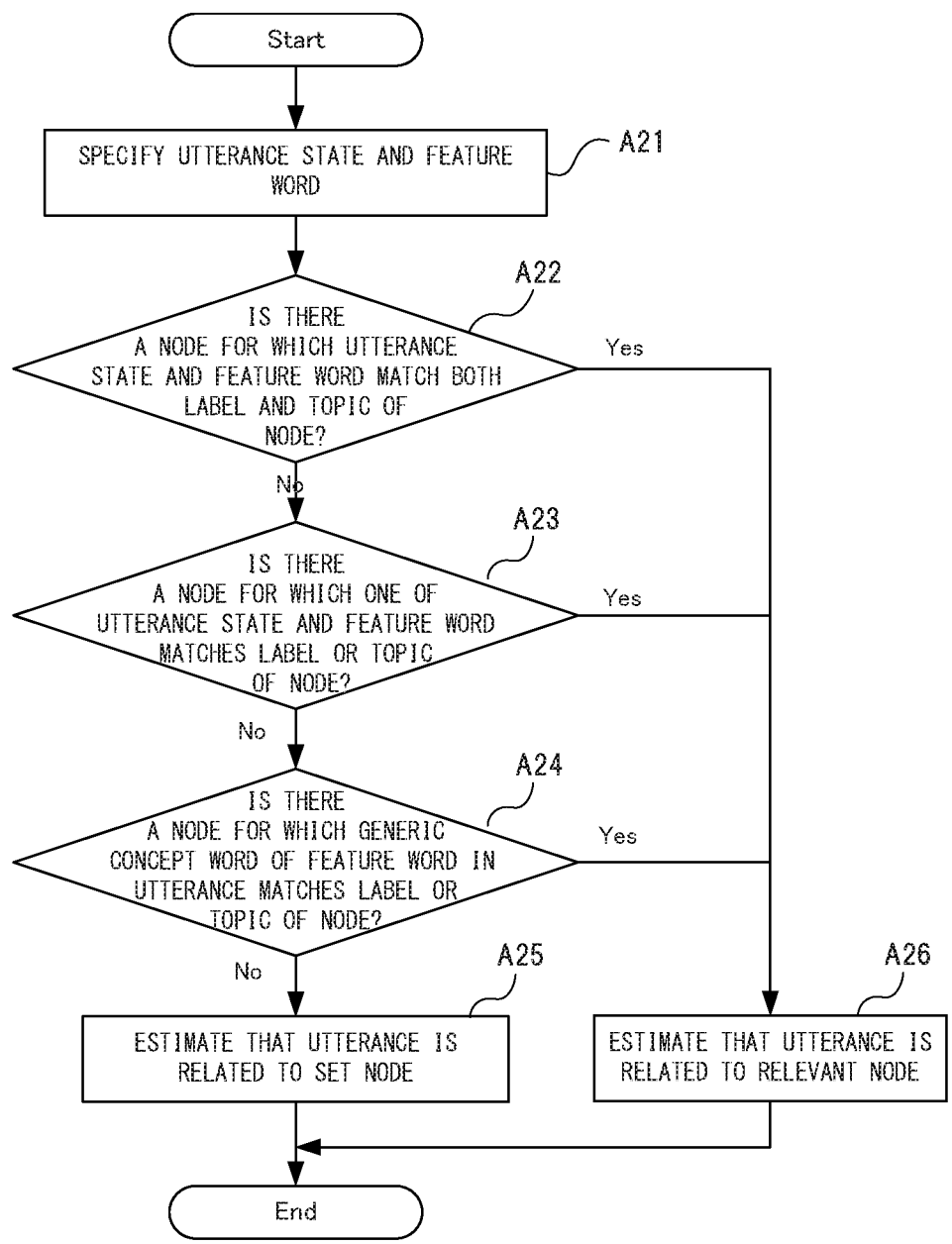
FIG. 6 is a flowchart specifically illustrating operations during node estimation processing, of the conversation support apparatus in the example embodiment of the present invention.

Here, step A3 illustrated in FIG. 5 will be described specifically with reference to FIG. 6. FIG. 6 is a flowchart specifically illustrating operations during node estimation processing, of the conversation support apparatus in the example embodiment of the present invention.

As illustrated in FIG. 6, first, the utterance position estimation unit 12 specifies a feature word and a state of the utterance received in step A1 (step A21).

Specifically, the utterance position estimation unit 12 uses a dictionary storing feature words prepared in advance and extracts one or more feature words from the text forming the utterance in the on-going conversation. Furthermore, the utterance position estimation unit 12 collates the one or more extracted feature words with the condition set for each utterance state and specifies a state with a matching condition. Note that examples of the conditions include the condition "If 'sofa', 'ring', and 'purchase' is extracted as a feature word, specify 'accept order' as the state", and the like.

Next, the utterance position estimation unit 12 determines whether or not there is a node for which the utterance state and the feature word specified in step A21 match both the label and the topic of the node (step A22). If the utterance position estimation unit 12 determines that there is a matching node as a result of the determination in step A22, the utterance position estimation unit 12 executes the later-described step A26.

On the other hand, if the utterance position estimation unit 12 determines that there is no such node as a result of the determination in step A22, the utterance position estimation unit 12 determines whether or not there is a node for which one of the utterance state and the feature word specified in step A21 matches the label or the topic of the node (step A23). If the utterance position estimation unit 12 determines that there is a matching node as a result of the determination in step A23, the utterance position estimation unit 12 executes the later-described step A26.

On the other hand, if the utterance position estimation unit 12 determines that there is no such node as a result of the determination in step A23, the utterance position estimation unit 12 determines whether or not there is a node for which a generic concept of the feature word in the utterance specified in step A21 matches the label or the topic of the node (step A24).

Specifically, in step A24, the utterance position estimation unit 12 uses a dictionary in which generic concept words of feature words are registered to specify a generic concept word of the feature word in the utterance, and compares the specified generic concept word and the label and the topic of each node. Note that in the dictionary, the following is registered, for example: "Feature word 'Product A'⇒generic concept word 'T-shirt'".

If the utterance position estimation unit 12 determines that there is a matching node as a result of the determination in step A24, the utterance position estimation unit 12 executes the later-described step A26. On the other hand, if the utterance position estimation unit 12 determines that there is no matching node as a result of the determination in step A24, the utterance position estimation unit 12 estimates that the utterance is related to the previously estimated node (current position node), or estimates that the utterance is related to a node that is the root of the conversation tree if no estimation has been previously made (step A25).

Furthermore, in step A26, the utterance position estimation unit 12 estimates that the utterance is related to the relevant node. Then, following the execution of step A25 or A26, the utterance position estimation unit 12 notifies the display unit 13 of the estimated node. Following this, step A4 illustrated in FIG. 5 is executed.

In this manner, steps A1 to A4 are executed each time a new utterance is generated. Thus, according to the present example embodiment, the operator can understand, at a glance, the state in which a conversation is currently situated, for each user. According to the present example embodiment, the occurrence of errors such as mistakes by operators at contact centers or the like can be suppressed.

Furthermore, in the present example embodiment, the utterance position estimation unit 12 can perform the following processing in place of steps A21 to A26. First, the utterance position estimation unit 12 converts the utterance into a numeric vector according to the frequency of appearance of words included in the utterance, or the like. Next, the utterance position estimation unit 12 calculates a numeric vector for each candidate node, with the current position node and a child node of the current position node being set as candidate nodes. Next, the utterance position estimation unit 12 calculates, for each candidate node, a score indicating the similarity between the numeric vector of the candidate node and the numeric vector of the utterance. Then, if there is a node having a score higher than or equal to a threshold value among the current position node and the child node of the current position node, the utterance position estimation unit 12 estimates that the utterance is related to that node. On the other hand, if there is no node having a score higher than or equal to the threshold value, the utterance position estimation unit 12 expands the subject of the search to the entire conversation tree and searches again for a node having a score higher than or equal to the threshold value.

Program

It suffices for the program in the present example embodiment to be a program that causes a computer to execute steps A1 to A4 illustrated in FIG. 5. By installing this program on a computer and executing the program, the conversation support apparatus and conversation support method in the present example embodiment can be realized. In this case, the central processing unit (CPU) of the computer functions as the utterance reception unit 11, the utterance position estimation unit 12, and the display unit 13 and performs processing.

Furthermore, the program in the present example embodiment may be executed by a computer system formed from a plurality of computers. In this case, the computers may each function as one of the utterance reception unit 11, the utterance position estimation unit 12, and the display unit 13, for example.

Figure 7:
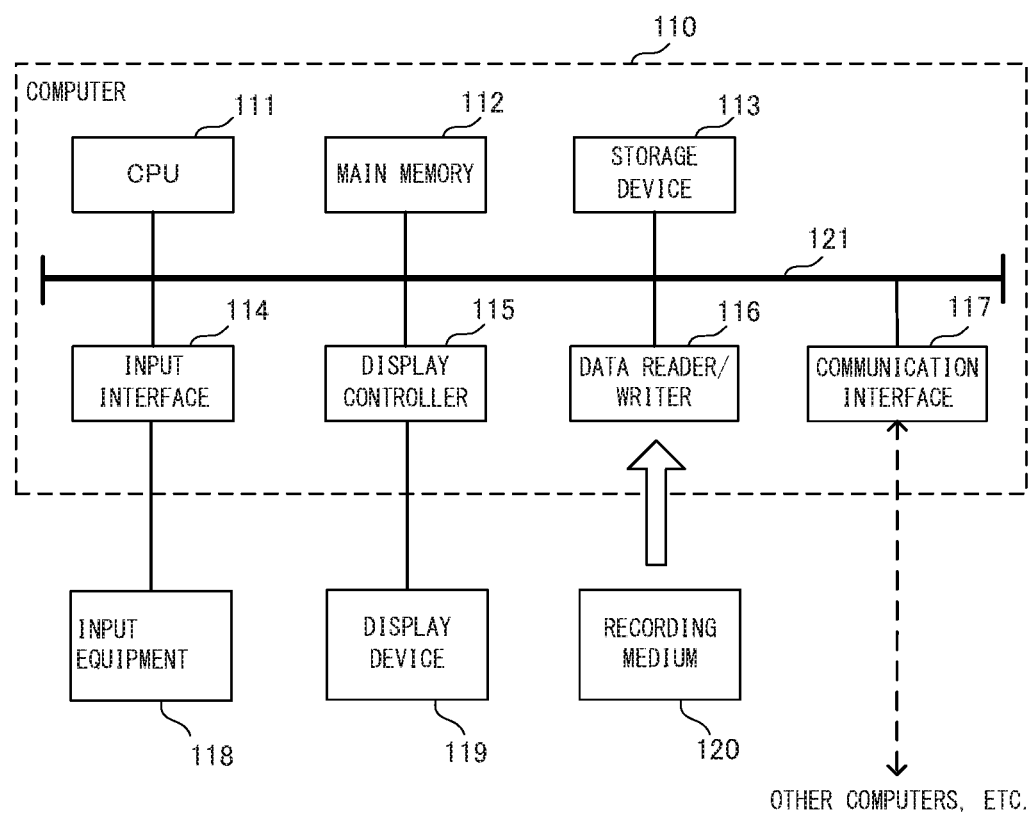
FIG. 7 is a block diagram illustrating one example of a computer realizing the conversation support apparatus in the example embodiment of the present invention.

Here, a computer that realizes the conversation support apparatus 10 by executing the program in the present example embodiment will be described with reference to FIG. 7. FIG. 7 is a block diagram illustrating one example of a computer realizing the conversation support apparatus in the example embodiment of the present invention.

As illustrated in FIG. 7, a computer 110 includes a CPU 111, a main memory 112, a storage device 113, an input interface 114, a display controller 115, a data reader/writer 116, and a communication interface 117. These components are connected via a bus 121 so as to be capable of performing data communication with one another.

The CPU 111 loads the program (codes) in the present example embodiment, which is stored in the storage device 113, onto the main memory 112, and performs various calculations by executing these codes in a predetermined order. The main memory 112 is typically a volatile storage device such as a dynamic random access memory (DRAM) or the like. Furthermore, the program in the present example embodiment is provided in a state such that the program is stored in a computer readable recording medium 120. Note that the program in the present example embodiment may be a program that is distributed on the Internet, to which the computer 110 is connected via the communication interface 117.

Furthermore, specific examples of the storage device 113 include semiconductor storage devices such as a flash memory, in addition to hard disk drives. The input interface 114 mediates data transmission between the CPU 111 and input equipment 118 such as a keyboard and a mouse. The display controller 115 is connected to a display device 119 and controls the display performed by the display device 119.

The data reader/writer 116 mediates data transmission between the CPU 111 and the recording medium 120, and executes the reading of the program from the recording medium 120 and the writing of results of processing in the computer 110 to the recording medium 120. The communication interface 117 mediates data transmission between the CPU 111 and other computers.

Furthermore, specific examples of the recording medium 120 include a general-purpose semiconductor storage device such as a CompactFlash (registered trademark, CF) card or a Secure Digital (SD) card, a magnetic storage medium such as a flexible disk, and an optical storage medium such as a compact disk read-only memory (CD-ROM).

Note that the conversation support apparatus 10 in the present example embodiment can also be realized by using pieces of hardware corresponding to the respective units, rather than using a computer on which the program is installed. Furthermore, a part of the conversation support apparatus 10 may be realized by using a program and the remaining part of the conversation support apparatus 10 may be realized by using hardware.

While a part of or the entirety of the above-described example embodiment can be expressed by (Supplementary Note 1) to (Supplementary Note 15) described in the following, the present invention is not limited to the following description.

Supplementary Note 1

A conversation support apparatus including:
an utterance reception unit configured to receive an utterance in an on-going conversation;
an utterance position estimation unit configured to, for each of a plurality of nodes in a conversation tree in which at least one of a label and a topic is provided to each of the plurality of nodes, collate the at least one of the label and the topic provided to the node and the received utterance, and estimate a node that is most related to the received utterance; and a display unit configured to add a visual characteristic representation to the estimated node and display the conversation tree on a screen.

Supplementary Note 2

The conversation support apparatus according to supplementary note 1, wherein the utterance reception unit receives an utterance for each of a plurality of on-going conversations, for each of the plurality of conversations, the utterance position estimation unit estimates a node that is most related to the received utterance, and the display unit adds a visual characteristic representation to the estimated node for each of the plurality of conversations and displays the conversation tree on the screen.

Supplementary Note 3

The conversation support apparatus according to supplementary note 1 or 2, wherein the conversation is a chat, and the utterance reception unit receives text representing an utterance in the chat.

Supplementary Note 4

The conversation support apparatus according to any one of supplementary notes 1 to 3, wherein a label and a topic are provided to each of the plurality of nodes in the conversation tree, and the utterance position estimation unit specifies a state indicated by the utterance and a feature word included in the utterance based on the received utterance, and collates the specified state of the utterance and the specified feature word with the label and the topic of each of the plurality of nodes to estimate a node that is most related to the received utterance.

Supplementary Note 5

The conversation support apparatus according to any one of supplementary notes 1 to 4, wherein the display unit adds a visual characteristic representation to the estimated node by making a color of the estimated node different from a color of other nodes.

Supplementary Note 6

A conversation support method including:

(a) a step of receiving an utterance in an on-going conversation;

(b) a step of, for each of a plurality of nodes in a conversation tree in which at least one of a label and a topic is provided to each of the plurality of nodes, collating the at least one of the label and the topic provided to the node and the received utterance, and estimating a node that is most related to the received utterance; and (c) a step of adding a visual characteristic representation to the estimated node and displaying the conversation tree on a screen.

Supplementary Note 7

The conversation support method according to supplementary note 6, wherein in the (a) step, an utterance is received for each of a plurality of on-going conversations, in the (b) step, for each of the plurality of conversations, a node that is most related to the received utterance is estimated, and in the (c) step, a visual characteristic representation is added to the estimated node for each of the plurality of conversations, and the conversation tree is displayed on the screen.

Supplementary Note 8

The conversation support method according to supplementary note 6 or 7, wherein the conversation is a chat, and in the (a) step, text representing an utterance in the chat is received.

Supplementary Note 9

The conversation support method according to any one of supplementary notes 6 to 8, wherein a label and a topic are provided to each of the plurality of nodes in the conversation tree, and in the (b) step, a state indicated by the utterance and a feature word included in the utterance are specified based on the received utterance, and the specified state of the utterance and the specified feature word are collated with the label and the topic of each of the plurality of nodes to estimate a node that is most related to the received utterance.

Supplementary Note 10

The conversation support method according to any one of supplementary notes 6 to 9, wherein in the (c) step, a visual characteristic representation is added to the estimated node by making a color of the estimated node different from a color of other nodes.

Supplementary Note 11

A computer readable recording medium that includes a program recorded therein, the program including instructions that cause a computer to carry out:

(a) a step of receiving an utterance in an on-going conversation;

(b) a step of, for each of a plurality of nodes in a conversation tree in which at least one of a label and a topic is provided to each of the plurality of nodes, collating the at least one of the label and the topic provided to the node and the received utterance, and estimating a node that is most related to the received utterance; and (c) a step of adding a visual characteristic representation to the estimated node and displaying the conversation tree on a screen.

Supplementary Note 12

The computer readable recording medium according to supplementary note 11, wherein in the (a) step, an utterance is received for each of a plurality of on-going conversations, in the (b) step, for each of the plurality of conversations, a node that is most related to the received utterance is estimated, and in the (c) step, a visual characteristic representation is added to the estimated node for each of the plurality of conversations, and the conversation tree is displayed on the screen.

Supplementary Note 13

The computer readable recording medium according to supplementary note 11 or 12, wherein
the conversation is a chat, and in the (a) step, text representing an utterance in the chat is received.

Supplementary Note 14

The computer readable recording medium according to any one of supplementary notes 11 to 13, wherein
a label and a topic are provided to each of the plurality of nodes in the conversation tree, and
in the (b) step, a state indicated by the utterance and a feature word included in the utterance are specified based on the received utterance, and the specified state of the utterance and the specified feature word are collated with the label and the topic of each of the plurality of nodes to estimate a node that is most related to the received utterance.

Supplementary Note 15

The computer readable recording medium according to any one of supplementary notes 11 to 14, wherein
in the (c) step, a visual characteristic representation is added to the estimated node by making a color of the estimated node different from a color of other nodes.

In the above, the present invention has been described with reference to an example embodiment. However, the present invention is not limited to the above-described example embodiment. Within the scope of the present invention, various modifications that could be understood by a person skilled in the art can be applied to the configurations and details of the present invention.

INDUSTRIAL APPLICABILITY

As described above, according to the present invention, the occurrence of errors such as mistakes by operators at contact centers or the like can be suppressed. The present invention is useful in a system that provides a contact center providing chat-based correspondence.

LIST OF REFERENCE SIGNS

10 Conversation support apparatus
11 Utterance reception unit
12 Utterance position estimation unit
13 Display unit
20 Terminal device of operator
21 Operator
30 Terminal device of user
31 User
40 Internet
50 Conversation tree
110 Computer
111 CPU
112 Main memory
113 Storage device
114 Input interface
115 Display controller
116 Date reader/writer
117 Communication interface
118 Input equipment
119 Display device
120 Recording medium
121 Bus

What is claimed is:

1. A conversation support apparatus comprising:
a processor; and
memory storing executable instructions that, when executed by the processor, causes the processor to perform as:
an utterance reception unit configured to receive an utterance in an on-going conversation;
an utterance position estimation unit configured to, for each of a plurality of nodes in a conversation tree in which at least one of a label and a topic is provided to each of the plurality of nodes, collate the at least one of the label and the topic provided to the node and the received utterance, and estimate a node that is most related to the received utterance; and
a display unit configured to add a visual characteristic representation to the estimated node and display the conversation tree on a screen,
wherein
a label and a topic are provided to each of the plurality of nodes in the conversation tree, and
the utterance position estimation unit specifies a state indicated by the utterance and a feature word included in the utterance based on the received utterance, and collates the specified state of the utterance and the specified feature word with the label and the topic of each of the plurality of nodes to estimate the node that is most related to the received utterance.

2. The conversation support apparatus according to claim 1, wherein
the utterance reception unit receives an utterance for each of a plurality of on-going conversations,
for each of the plurality of conversations, the utterance position estimation unit estimates a node that is most related to the received utterance, and
the display unit adds a visual characteristic representation to the estimated node for each of the plurality of conversations and displays the conversation tree on the screen.

3. The conversation support apparatus according to claim 1, wherein
the conversation is a chat, and the utterance reception unit receives text representing an utterance in the chat.

4. The conversation support apparatus according to claim 1, wherein
the display unit adds a visual characteristic representation to the estimated node by making a color of the estimated node different from a color of other nodes.

5. A conversation support method comprising:
receiving an utterance in an on-going conversation;
for each of a plurality of nodes in a conversation tree in which at least one of a label and a topic is provided to each of the plurality of nodes, collating the at least one of the label and the topic provided to the node and the received utterance, and estimating a node that is most related to the received utterance; and
adding a visual characteristic representation to the estimated node and displaying the conversation tree on a screen,
wherein
a label and a topic are provided to each of the plurality of nodes in the conversation tree, and in the collating, a state indicated by the utterance and a feature word included in the utterance are specified based on the received utterance, and the specified state of the utterance and the specified feature word are collated with the label and the topic of each of the plurality of nodes to estimate the node that is most related to the received utterance.

6. The conversation support method according to claim 5, wherein
in the receiving, an utterance is received for each of a plurality of on-going conversations,
in the collating, for each of the plurality of conversations, a node that is most related to the received utterance is estimated, and
in the adding, a visual characteristic representation is added to the estimated node for each of the plurality of conversations, and the conversation tree is displayed on the screen.

7. The conversation support method according to claim 5, wherein
the conversation is a chat, and in the receiving, text representing an utterance in the chat is received.

8. The conversation support method according to claim 5, wherein
in the adding, a visual characteristic representation is added to the estimated node by making a color of the estimated node different from a color of other nodes.

9. A non-transitory computer readable recording medium that includes a program recorded therein, the program including instructions that cause a computer to carry out:
receiving an utterance in an on-going conversation;
for each of a plurality of nodes in a conversation tree in which at least one of a label and a topic is provided to each of the plurality of nodes, collating the at least one of the label and the topic provided to the node and the received utterance, and estimating a node that is most related to the received utterance; and
adding a visual characteristic representation to the estimated node and displaying the conversation tree on a screen,
wherein
a label and a topic are provided to each of the plurality of nodes in the conversation tree, and
in the collating, a state indicated by the utterance and a feature word included in the utterance are specified based on the received utterance, and the specified state of the utterance and the specified feature word are collated with the label and the topic of each of the plurality of nodes to estimate the node that is most related to the received utterance.

10. The non-transitory computer readable recording medium according to claim 9, wherein
in the receiving, an utterance is received for each of a plurality of on-going conversations,
in the collating, for each of the plurality of conversations, a node that is most related to the received utterance is estimated, and
in the padding, a visual characteristic representation is added to the estimated node for each of the plurality of conversations, and the conversation tree is displayed on the screen.

11. The non-transitory computer readable recording medium according to claim 9, wherein
the conversation is a chat, and in the receiving, text representing an utterance in the chat is received.

12. The non-transitory computer readable recording medium according to claim 9, wherein
in the padding, a visual characteristic representation is added to the estimated node by making a color of the estimated node different from a color of other nodes.

* * * * *